United States Patent [19]

Bailey

[11] Patent Number: 4,721,641
[45] Date of Patent: Jan. 26, 1988

[54] AUTO ACCESSORY FLOOR MAT

[76] Inventor: Bob Bailey, R.D. #3, Maple Ave., Ballston Lake, N.Y. 12019

[21] Appl. No.: 730,192

[22] Filed: May 3, 1985

[51] Int. Cl.$^4$ .............................................. B05D 5/12
[52] U.S. Cl. .................................... 428/88; 428/95; 428/96; 428/158; 428/159; 428/160; 428/161; 428/172; 428/192
[58] Field of Search ............... 428/192, 88, 96, 95, 428/158–161, 172; D12/203

[56] References Cited

U.S. PATENT DOCUMENTS

| | | | |
|---|---|---|---|
| 3,042,564 | 7/1962 | Hankins | 154/49 |
| 3,804,699 | 4/1974 | Johnson | 161/39 |
| 4,016,318 | 4/1977 | Di Gioia et al. | 428/95 |
| 4,230,755 | 10/1980 | Morris | 428/95 |
| 4,382,986 | 5/1983 | Reuben | 428/88 |
| 4,399,176 | 8/1983 | Bell et al. | 428/85 |
| 4,465,720 | 8/1984 | Bell et al. | 428/85 |
| 4,529,639 | 7/1985 | Peoples, Jr. et al. | 428/95 |
| 4,579,764 | 4/1986 | Peoples, Jr. et al. | 428/95 |

FOREIGN PATENT DOCUMENTS 2340496 4/1980 Fed. Rep. of Germany .
2062861 9/1970 France .
2547252 7/1983 France .

OTHER PUBLICATIONS

Volvo Accessories, All Models VPD 150-85.

Primary Examiner—John E. Kittle
Assistant Examiner—P. R. Schwartz
Attorney, Agent, or Firm—Heslin & Rothenberg

[57] ABSTRACT

An accessory floor mat designed to overlie and protect a portion of the original carpeted floor of an automobile is preformed into a tray-like configuration which also conforms to the contours of the floor portion. The mat snugly fits into the carpeted floor well on a side of the vehicle and thereby resists mat sliding. The rigidity of the mat is such that it maintains its original position in the vehicle and also retains its shape when removed for cleaning. Raised borders of the mat terminate in rolled edges which eliminate the need for surging or otherwise finishing these edges. Optionally the mat can be provided with a recessed heel pad. The composite carpet structure from which the mat is molded preferably includes a layer of carpet fibers tufted into a primary backing material which is bonded to a sheet of open-celled foam by an extruded thermoformable copolymer of polyethylene and ethylene vinyl acetate.

23 Claims, 6 Drawing Figures

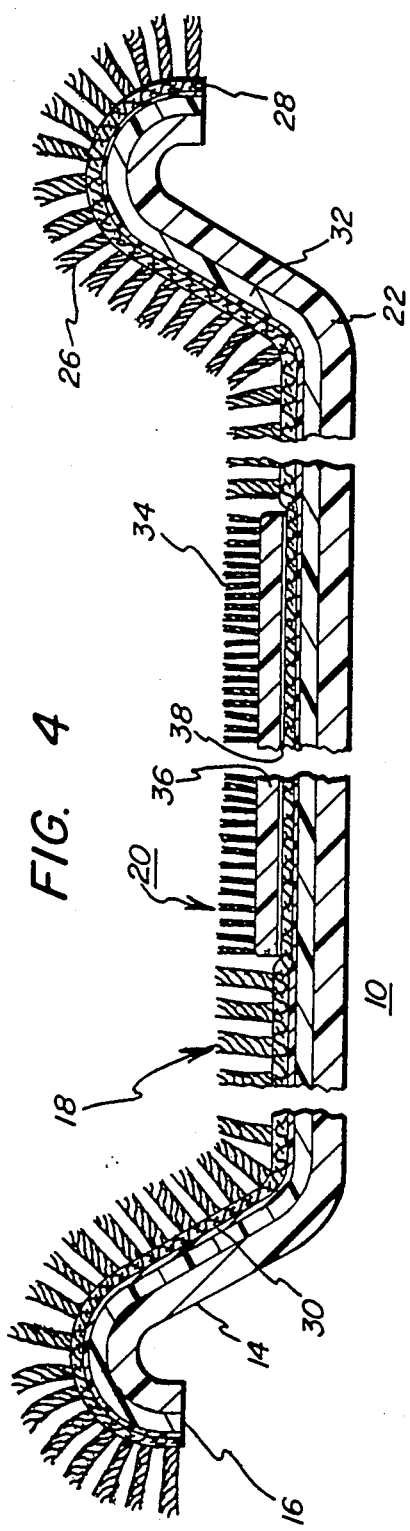
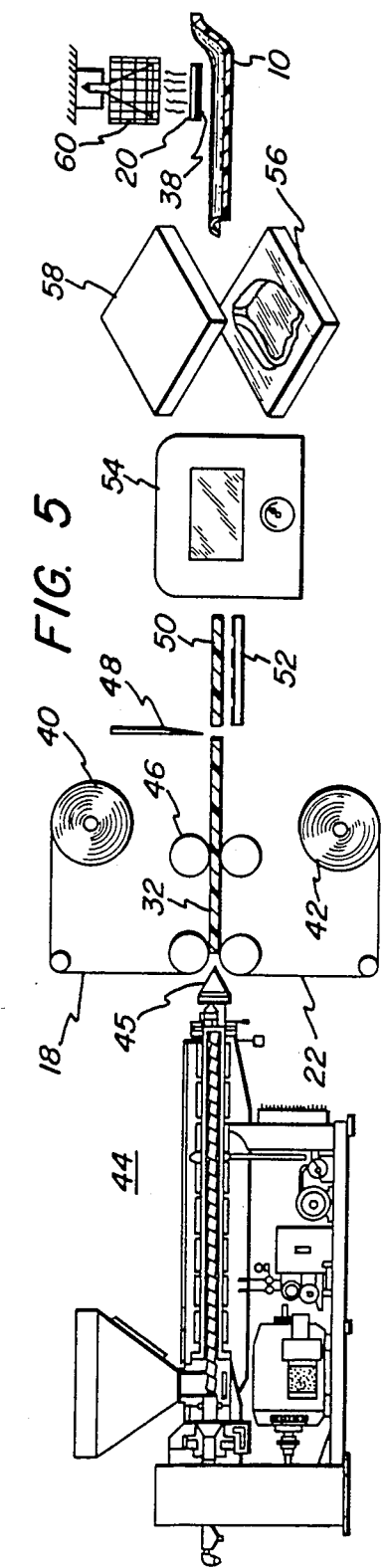

AUTO ACCESSORY FLOOR MAT

BACKGROUND OF THE INVENTION

1. Field of the Invention

The present invention relates to mats for use in automobiles and other motor vehicles and more particularly to removable accessory mats designed to overlie and protect carpeted automobile floors.

2. Background Information

Floor mats of the "throw-in" or accessory type are popularly used to protect the carpeted floor of automobiles. Such mats are generally manufactured with a planar configuration and are customarily made of an elastomeric material sufficiently fexible to conform, in a general way, when placed in use, to the multiplicity of shapes and contours characteristic of today's automobile floors. Sometimes, a carpet layer is secured to the top of the elastomeric material.

A primary concern with respect to such automobile floor mats is their tendency to shift or move from their intended position in response to lateral forces experienced during occupant ingress egress and in the course of normal driving operations. This can result in the bunching gathering and general disarray of the mat on the automobile floor; moreover, movement of the floormat on the driver's side can present a significant safety hazard if the mat shifts so as to interfere with the accelerator, brake pedal or other automobile controls. Automobile manufacturers have experienced major liability claims related to alleged floor mat movement, not to mention the toll in human suffering, property damage and increased insurance premiums arising from auto accidents. Mat movement is, therefore, considered a serious and significant concern in relation to "throw-in" mats.

To address this problem, attempts have been made in the past to increase the coefficient of friction between the mat and the supporting carpeted automobile floor. Nibs or corrogations have been molded into the back of the elastomeric layer and/or an additional anti-skid layer, such as a polyurethane coating, has been sprayed on the bottom of the elastomeric material. Others have attempted to increase the staying power of their mats by embedding or securing rigidifying elements, e.g. rod-like elements or thin, flat sheets, to the flexible elastomeric mat. See U.S. Pat. Nos. 4,399,176 and 4,465,720.

Another approach (See U.S. Pat. No. 4,382,986) employs a mat having a relatively stiff planar first section adapted to contact a generally horizontal portion of an automobile floor and a second relatively flexible portion hinged to said first portion and adapted to rest against an inclined firewall of the automobile. Other prior art efforts to reduce mat slippage have employed mechanical retaining means to fasten the accessory mat to the underlying carpeted surface.

U.S. Pat. No. 3,804,699 discusses a slip-resistant mat in which a gripping layer of resilient polymeric slit foam is bonded by a fused vinyl resin plastisol to a facing layer of carpeted fabric. FIG. 3 of this patent illustrates application of the patented invention to an automotive mat in which flap sections are adapted to bend upwardly (or downwardly) onto surfaces having slopes of different angles and directions.

Although providing increased slip resistance, the above described efforts have not been totally successful in eliminating mat slippage and, in some cases, have been accompanied by undue complexity and manufacturing expense. Furthermore, these earlier mats appear to be intended for generic use in all automobiles and, accordingly, are not especially well suited to accommodate the particular cut-outs and contours of, and provide maximum protection to, the carpeted foot space of particular vehicle models.

Molded mats made by injection molding of thermoplastic materials and contoured for an exact fit to a particular automobile floor have been commercially available. At least some of these thermoplastic mats have featured raised borders and waffle patterns to trap dirt, water and snow; rigid construction to permit fast, easy removal for cleaning; and a studded bottom surface to prevent slipping. However, such mats lack the plushness, fabric resiliency and water absorption capability afforded by carpeted floor mats. Further, there is a tendency with such thermoplastic mats for accumulated dirt to be ground into the occupant's shoes and/or for the shoes to sit in a puddle of water.

For sometime, moldable carpeting has been used to cover the bare metal floor of automobiles; e.g. see U.S. Pat. No. 4,230,755. However, such original carpeting is generally adhesively secured to the underlying floor and, accordingly, manufacturers thereof have not been concerned with the movement problem and other considerations associated with removable auto accessory floor mats. To the best of Applicant's knowledge, heretofore no one has successfully developed an accessory automotive floor mat which passively but positively solves the mat shifting problem and at the same time provides an easily removable, attractive carpeted surface.

SUMMARY OF THE INVENTION

The present invention answers this need by providing an accessory floor mat of composite carpet structure molded or otherwise preformed into a tray-like shape which conforms to the contour of a portion of the carpeted automobile floor. The mat is dimensioned and configured to nest within and abut against the sides of a carpeted floor well of the vehicle. This snug fit in combination with the rigidity of the mat prevents mat sliding. The mat is sufficiently rigid so that it not only maintains its original position within the vehicle and withstands foot exerted lateral forces without shifting but also retains its shape while being removed, thereby facilitating cleaning. Raised borders of the mat advantageously terminate in rolled or down turned edges which eliminate the need for serging or otherwise further finishing these edges.

The mat of the present invention is constructed in the form of a laminated composite carpet structure from a layer of carpet bonded to an open-celled foam sheet backing by a middle layer of extruded thermoformable material. In the presently preferred embodiment, the carpet comprises tufted carpet fibers secured to a woven backing material by a coating of polyurethane; the foam sheet backing comprises flexible polyester urethane; and the thermoformable polymer comprises a copolymer of polyethylene and ethylene vinyl acetate. The carpet provides an attractive, resilient and absorbent top surface to the mat. The thermoformable polymer facilitates custom molding and affords appropriate rigidity and water impregnability; while the foam backing provides an added measure of slip resistance as well as an attractive, printable rear surface. Together these constituents, constructed and arranged in accordance with the teachings of this invention, provide a safer, more attractive accessory floor mat than has heretofore been available.

The invention further contemplates particular formulations and constructions of the components of the mat, an optional recessed heel pad, and a method of manufacturing the unique accessory floor mats.

Accordingly, a principle object of the present invention is to provide a carpeted accessory floor mat which overcomes the problem of mat sliding and thereby reduces the safety risk associated therewith.

Another object is to provide such a mat which affords a passive solution to the mat sliding problem thereby eliminating the need for vehicle operator/passenger intervention by use of clips or other mat securing devices.

Another object is to provide such a mat which does not require edge finishing, while being highly attractive in appearance.

A further object is to provide such a mat which affords maximum protection to the carpeted floor wells of particular vehicle models and is also easily removable for cleaning.

A still further object is to provide such a mat which overcomes the problem, associated with conventional floor mats, of water and dirt spilling off the sides of the mat when it is removed from the vehicle.

Yet another object is to provide such an accessory floor mat which can be readily and economically manufactured.

A still further object is to provide such a mat which can accommodate various grades of carpeting including a plush deep pile which conveys a sense of luxuriousness, and/or one that matches and therefore blends with the original carpeted floor.

BRIEF DESCRIPTION OF THE DRAWINGS

These and other objects, features and advantages of the present invention will be more readily apparent from the following detailed description read in conjunction with the accompanying drawings in which:

FIG. 4 is a cross-sectional view of a floor mat of the present invention incorporating a heel pad;

FIG. 5 is a simplified schematic of a floor mat manufacturing process of the invention.

DETAILED DESCRIPTION

Figure 1:
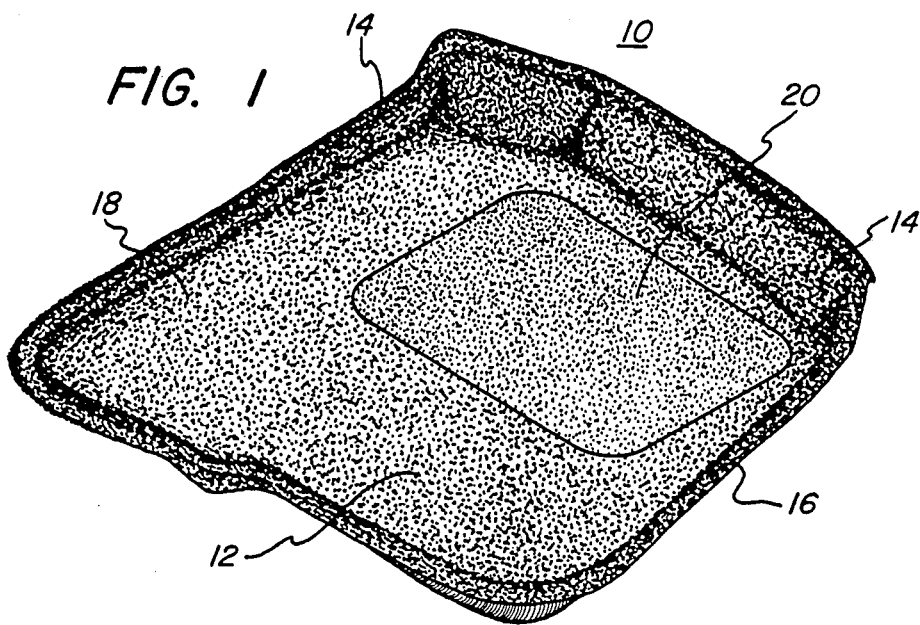
FIG. 1 is a perspective view from above of an accessory floor mat constructed in accordance with the principles of the present invention.

Referring now to FIG. 1, an accessory floor mat 10 constructed in accordance with the principles of this invention, is illustrated. The mat includes a base portion 12 designed to rest upon, match in contour, and protect a generally horizontal portion of the carpeted floor well of a motor vehicle, and raised borders 14 which follow the contours of the periphery of the floor well and provide a tray-like configuration to the mat. Raised borders 14 terminate in rolled or down turned edges 16 which, as more fully explained hereinafter, provide an attractive edge finish and additional rigidity to the mat.

The top of mat 10 comprises a layer of carpet 18 which covers the base portion 12 as well as raised borders 14. This top layer of carpet provides an extremely attractive appearance, is resilient and moisture absorbent. Although other types and grades of carpet may be used, most preferable is a tufted, cut pile carpet of synthetic fibers in a woven, primary backing material, for example a 22 ounce nylon pile carpet may be employed.

Also shown in FIG. 1 is a heel pad 20 which may be optionally incorporated into a floor mat for the driver's side of the vehicle. The construction and a preferred method of securing heel pad 20 in the floor mat will be described hereinafter.

Figure 2:
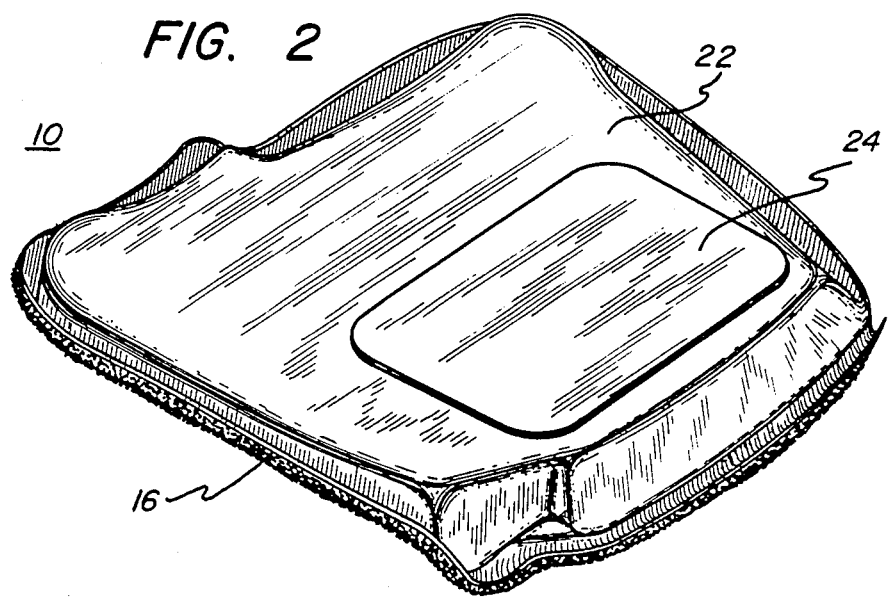
FIG. 2 is a perspective view of the underside of the floor mat of FIG. 1.

FIG. 2 illustrates the bottom of floor mat 10 and reveals how the underside of the base portion and the raised borders of the mat are formed to follow the contour of a floor well in which the mat is intended to nest. The mat 10 preferably includes a bottom layer of open-celled foam 22 substantially coextensive with the top layer of carpet 18. The foam layer provides a finished appearance to the underside of the mat, additional slip resistance and a surface which may be readily printed upon, for example by the rotogravure method.

Also shown in FIG. 2, is the underside 24 of an indentation or recessed cavity which may be molded into the top of floor mat 10 to accommodate heel pad 20 in such a way that the top of the heel pad is substantially flush with the top of the rest of the mat. Underside 24 may extend slightly beyond the bottom surface of adjoining portions of the mat, e.g. 0.125 inches. Alternatively a heel pad may be accommodated in the driver's side floor mat, without recessing, as more fully described hereinafter.

Mat 10 is molded or otherwise permanently preformed from a composite carpet structure into the tray-like, floor well contour matching configuration illustrated in FIGS. 1 and 2. The molded composite carpet structure described more fully hereinafter, has sufficient rigidity to retain this shape both when placed in use on the carpeted floor of an automobile and when removed for cleaning purposes. The custom molding of each mat to snugly fit within the carpeted floor well of a particular model vehicle along with the waterproof nature and tray-like configuration of the mat provide for maximum protection of the underlying original automobile carpeting. The rigidity, contouring and dimensioning of the mat lend it a non-slip capability which can be supplemented by the gripping nature of the open-celled foam backing.

Figure 3:
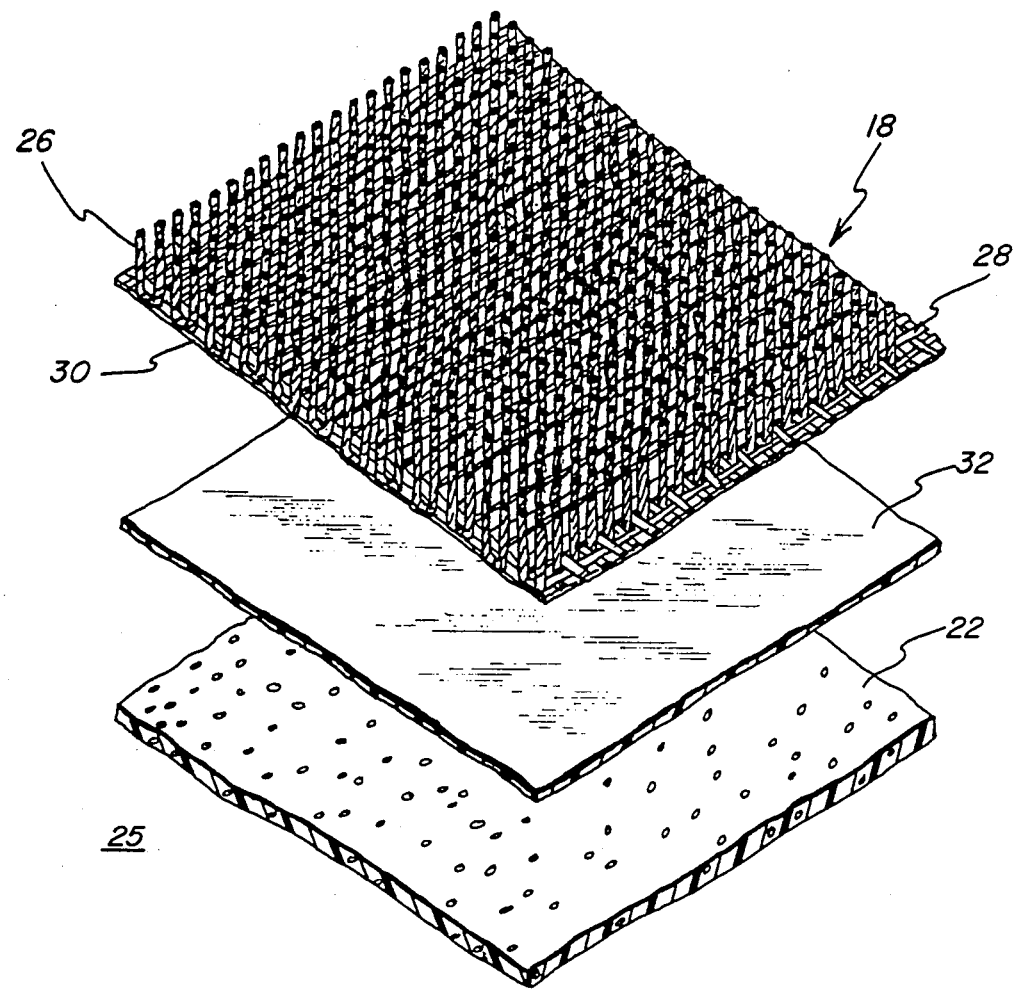
FIG. 3 is a cross-sectional blowup of a composite carpet structure of the present invention.

FIG. 3 illustrates in blownup cross-sectional view the preferred construction of composite carpet structure 25 from which the accessory floor mat of this invention is manufactured. Composite carpet structure 25 is preferably a 3-ply laminate of carpeting 18 bonded to a sheet of open-celled foam 22 by extruded thermoformable material 32. As shown, carpet layer 18 preferably includes carpet fibers 26, composed e.g., of nylon, tufted into a primary backing material 28 which may be either woven or non woven. To increase tuft bind, a spray coating 30 of polyurethane is applied to the tufted carpet. Latex or other known materials exhibiting similar strong tuft binding qualities may also be used for this purpose.

The extruded thermoformable material 32 facilitates molding of the composite carpet structure into the desired permanent configuration, lends appropriate structural rigidity to the mat and serves as a water impervious layer. Although other compositions exhibiting equivalent qualities may be employed, preferably the thermoformable material consists of a copolymer of high density polyethylene and ethylene vinyl acetate formulated from a combination of substantially 90 parts by weight of polyethylene and 10 parts by weight of ethylene vinyl acetate. The latter is added to enhance the adhesion between the carpet and foam layers. The thermoformable material layer preferably has a stiffness of 67±3 as measured by a Shore D durometer. Typical specifications for the ingredients of the preferred copolymer thermoformable material follows:

| Ethylene Vinyl Acetate Specifications | |
|---|---|
| % Vinyl Acetate | 8–11 |
| Melt Index (ASTM D1238 Cond. E) | 2.5 ± 1.0 |
| Density (g/cc) | 0.92–0.935 |
| Tensile @ Break (PSI) | 2,000 |
| Elongation @ Break (%) | 700 |
| 1% Scant Modulus (PSI) | 11,500 |
| Hardness (Shore A) | 89 |
| Ring & Ball Softening Point (°F.) | 325 |
| High Density Polyethylene Specifications | |
| Melt Index (ASTM D1238 Cond. E) | 2.5 ± 1.0 |
| Density (g/cc) | 0.955 |
| Tensile @ Break (PSI) | 4100 |
| Elongation @ Break (%) | 200 |
| 100% Modulus (PSI) | 4000 |
| Vicat Softening Point (°F.) | 245 |
| Low Temperature Brittleness (°F.) | −95 |
| Hardness (Shore D) | 62 |

The bottom foam layer 22 of composite carpet structure 25 preferably comprises a sheet of open-celled polyurethane material. A sheet of flexible polyester urethane with about 60 cells per linear inch, elongation of 300%, and a compression force deflection at 25% of 50–65 pounds per square inch has been advantageously employed for this purpose. Although not absolutely essential, the foam backing provides a highly slip-resistant surface which can also be printed upon and affords a finished appearance to the underside of the mat. Foam sheet materials of substantially equivalent quality may be substituted for the polyurethane material.

FIG. 4 is a cross-sectional view of a floor mat incorporating a heel pad according to one version of the invention. In addition to the composite carpet structure described above, FIG. 4 depicts an optional heel pad 20 located within a floor mat for the driver's side of a vehicle. The heel pad which needs to withstand extensive wear and tear is preferably constructed of a woven heavy-weight carpet 34 and backing 36. For example, a 56 ounce axminster carpet with a polypropelene backing may be employed. The heel pad may be secured with a heat activated adhesive 38 so that the top of the heel pad is substantially flush with the top of the surrounding carpet layer 18. Alternatively the heel pad may be embedded in and directly dielectrically fused to the floor mat, either with or without providing a recessed cavity in the mat.

The rounded edges 16 of raised borders 14 are also clearly illustrated in FIG. 4. This unique feature adds additional rigidity to the mat and provides a natural finish to the edges without the labor intensive step of vinyl binding or yarn serging which is generally employed with existing carpeted floor mats. Mat 10 is dimensioned and configured so that rolled edges 16 abut against the periphery of the carpeted floor well in which the mat is placed thereby precluding mat movement.

A method of manufacturing the improved floor mat of the present invention is illustrated in schematic form in FIG. 5. As shown therein, carpet 18 from a supply roll 40 and sheet foam 22 from a supply roll 42 are brought into juxtaposition and thermoformable material 32 from extruder 44 is deposited uniformly therebetween to form the desired laminated composite carpet structure. Extruder 44 may be any of the commercially available extrusion devices which, in known manner can, under heat and pressure soften the thermoformable material and force it under control out of a die 45 at pressures e.g. from 4–5,000 PSI. For example, extruder 44 might be an extrusion sheetline device manufactured by Gloucester Engineering Co. Inc. of Massachusetts.

Pull rollers 46 move the composite carpet structure after lamination to a shearing station 48 where the carpet structure is cut to predetermined dimensions. The cut carpet structure is preferably sized so that it will overlie to a desired extent the carpeted floor well of a particular vehicle model.

The cut composite carpet structure 50 can then be transported, e.g. on a pallet 52 to a preheating station where, after removal from the pallet, it is heated in an oven 54 or equivalent structure to a temperature at which it is formable. The preheated composite carpet structure is then shaped by molding, preferably between a matched set die comprising a female vacuum die 56 and a male plug die 58. The dies are constructed so as to form the composite carpet structure into a tray-like configuration with raised borders having the previously described rolled edges as well as a shape which matches the contour of the carpeted floor well of the vehicle for which the mats are being made.

The molded carpet structure is then allowed to cool producing the preshaped accessory floor mat 10 with the outstanding attributes described herein. Available thermoforming equipment, for example, a rotary industrial thermoformer available from Koster Enterprises, Inc. of Riviera Beach, Fla. can be used to implement the preheating and molding steps.

When it is desired to insert a heel pad in an accessory floor mat intended for use on the driver's side of the vehicle, a recessed cavity of appropriate dimensions can be advantageously formed in the mat during the molding stage. Heel pad 20, the underside of which may be coated with a heat activated adhesive 38, is then secured in the recessed cavity by applying heat from heating member 60. Heater 60 is preferably a dielectric type heater, for example, a 40 KW model available from the Solydyne company of Long Island. Other known methods of securing a heel pad in the mat, either with or without the recessed cavity, may also be employed for this purpose.

Figure 6:
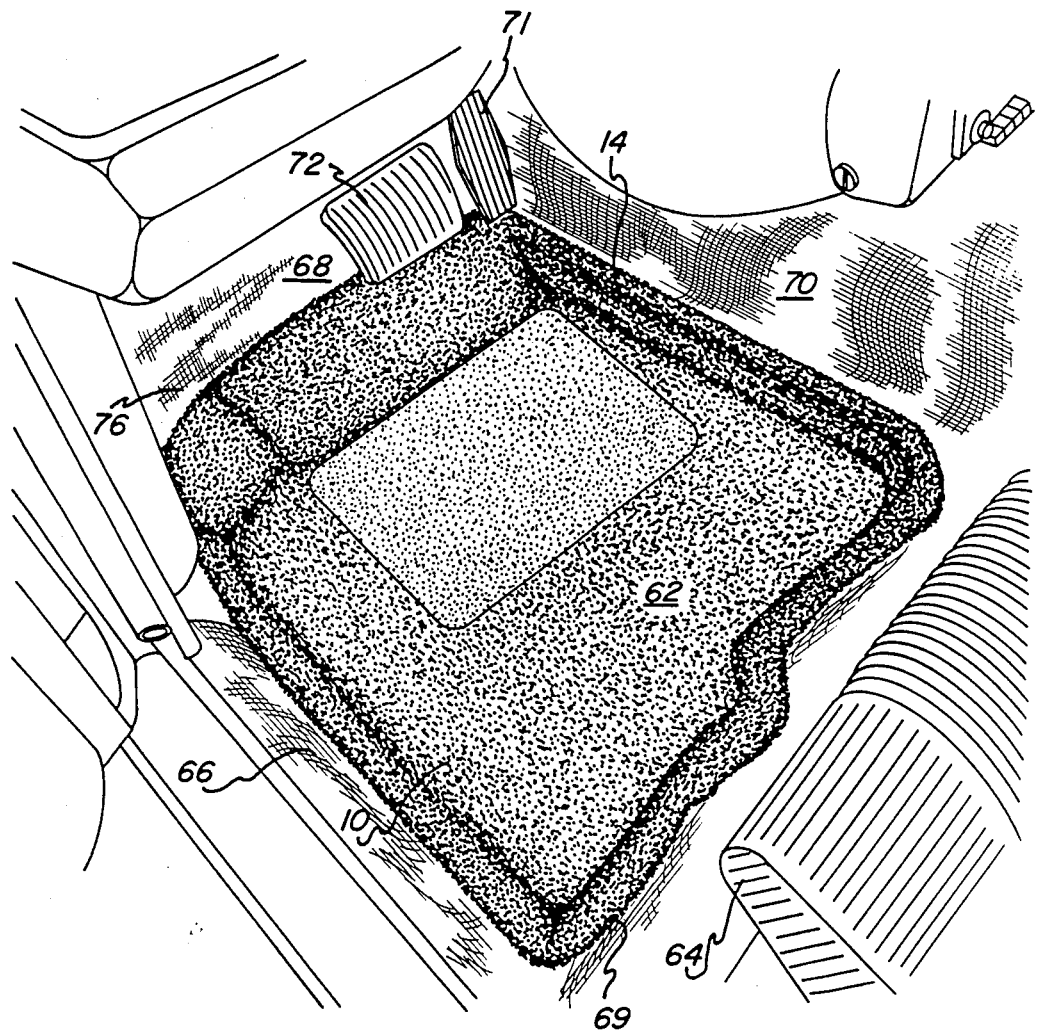
FIG. 6 is a perspective view illustrating the use of the accessory floor mat of FIG. 1 in a carpeted floor well.

In FIG. 6, use of the molded accessory floor mat of the present invention on the driver's side of a motor vehicle is illustrated. Mat 10 is located in the foot space or carpeted floor well 62 in front of driver's seat 64. The mat is custom molded to match the contour of the floor well and nest therein so that the edges of raised borders 14 abut against the periphery of the floor well, i.e. against carpeted surfaces of side sill 66, firewall 68, rear wall 69 and central (transmission) tunnel 70. As illustrated, the mat accommodates gas pedal 71, brake pedal 72 and other controls (not shown) of the vehicle. When lodged in floor well 62, mat 10 is precluded from sliding on underlying original carpeting 76 by its snug fit and substantially rigid construction. Interference with the automobile's controls and the other problems associated with mat movement are thereby avoided. Mats similarly constructed and appropriately contoured can, of course, be employed to protect the portions of the carpeted automobile floor in the passenger sections of the vehicle.

It will thus be apparent that, in accordance with the teachings of this invention, a set of mats can be formed specifically for a car model which will provide an added margin of safety, increased protection to the vehicle's original carpeting and improved interior appearance. Thanks to this invention, accessory floor mats possessing these superior qualities, and fulfilling all of the objects stated hereinbefore, can be readily manufactured and made available to the public.

From the foregoing detailed description of illustrative embodiments of the invention, it will be readily apparent to those skilled in this art that various modifications, substitutions, variations, etc. can be made without departing from the scope of the invention as defined by the claims appended hereto. For example, instead of custom molding mats to a particular vehicle model, it may be possible to design and construct a mat to fit several vehicle models having similarly contoured floor wells. Based on the teachings of this invention, other variations will suggest themselves to those versed in this art.

What is claimed is:

1. A readily removable, slip-resistant accessory floor mat for protecting a carpeted floor well of an automobile or other vehicle comprising:
   a rigid composite carpet struture preformed into a tray configuration with raised borders, the raised borders having the same general contour as the periphery of the carpeted well, at least some of said raised borders being provided with outwardly extending down-turned edges to eliminate the need for edge finishing, the carpet structure being dimensioned so as to fit within said well and rest upon the floor of the well with said raised borders abutting the periphery of the well, the composite carpet structure comprising a layer of carpet and a substantially unpliable layer of thermoformable material attached to the underside of said layer of carpeting, and the carpet structure possessing sufficient rigidity to remain stationary and not shift under foot-exerted lateral forces experienced during use of the automobile by the mat when so positioned in the well and to maintain its tray configuration while being removed from the well.

2. The floor mat of claim 1 wherein the layer of carpet comprises carpet fibers tufted into a primary backing material.

3. The floor mat of claim 2 wherein the thermoformable material comprises a polymer.

4. The floor mat of claim 2 wherein the layer of carpeting further includes a coating of polyurethane applied to the underside of the primary backing material to increase tuft bind.

5. The floor mat of claim 1 wherein the thermoformable material comprises a copolymer of polyethylene and ethylene vinyl acetate.

6. The floor mat of claim 5 wherein the copolymer is formulated from a combination of substantially 90 parts by weight of high density polyethylene and 10 parts by weight of ethylene vinyl acetate.

7. The floor mat of claim 6 wherein the ethylene vinyl acetate comprises 8%-11% vinyl acetate.

8. The floor mat of claim 7 wherein said composite carpet structure further includes a layer of open-celled foam laminated to the underside of the layer of thermoformable material to provide added slip resistance.

9. The floor mat of claim 1 wherein said composite carpet structure further includes a layer of open-celled foam laminated to the underside of the layer of thermoformable material to provide added slip resistance.

10. The floor mat of claim 9 wherein said layer of foam comprises a sheet of polyurethane.

11. The floor mat of claim 10 wherein said composite carpet structure is provided with a molded recess to receive a heel pad.

12. The floor mat of claim 11 further comprising a woven carpet heel pad secured in said recess.

13. The floor mat of claim 1 wherein the layer of thermoformable material has a stiffness substantially in the range of 64-70 as measured by a Shore D durometer.

14. The floor mat of claim 1 wherein the composite carpet structure is custom molded to fit snugly in a carpeted floor well of a particular vehicle model.

15. The floor mat of claim 1 wherein the composite carpet structure is molded to fit multiple vehicle models having similarly configured floor wells.

16. An accessory floor mat designed to overlie a portion of the carpeted floor of a motor vehicle, said mat comprising a rigid composite carpet structure having a preformed shape which is in substantial conformance with the contour of said carpeted floor portion, said mat having raised borders which give it a tray-like configuration and which abut against walls surrounding the carpeted floor portion to hold the mat snug in place, said borders being provided with outwardly extending down-turned edges to eliminate the need for edge finishing, and said mat possessing sufficient rigidity to withstand foot-exerted lateral forces associated with motor vehicle operation without shifting and to retain said shape and configuration while being removed from the vehicle.

17. The floor mat of claim 16 wherein the raised borders terminate in rolled edges.

18. The floor mat of claim 16 wherein the composite carpet structure comprises a layer of carpeting laminated to a sheet of open-celled foam by an extruded thermoformable polymer material.

19. The floor mat of claim 18 wherein the layer of carpeting comprises tufted carpet fibers secured to a primary backing by a coating of polyurethane;
   the open-celled foam comprises a sheet of flexible polyester urethane with substantially 60 cells per linear inch; and
   the thermoformable polymer material comprises a copolymer formulated from substantially 90% polyethylene and 10% ethylene vinyl acetate.

20. The floor mat of claim 17 wherein the composite carpet structure comprises a layer of carpeting and a layer of thermoformable material attached to the underside of said layer of carpetering, and wherein the thermoformable material comprises a copolymer of polyethylene and ethylene vinyl acetate having a Shore D durometer reading substantially in the range of 64-70.

21. A rigid throw-in floor mat for a motor vehicle comprising a three-ply laminated structure of carpet, thermoformable polyethylene and open-celled foam sheet backing, said laminated structure being custom molded into a shape which conforms to the configuration of a portion of the carpeted floor and surrounding side walls of a particular model motor vehicle, said structure having raised borders provided with outwardly extending down-turned edges to eliminate the need for edge finishing, said structure being readily removable from the motor vehicle and rigid enough to both retain said shape while being removed and not shift under foot-exerted lateral forces when in use.

22. A readily removable, slip-resistant accessory floor mat for nesting within a floor well of an automobile or other vehicle comprising:
   a multi-layered rigid composite carpet structure preformed into a tray configuration with raised borders, at least a portion of said raised borders being provided with an outwardly extending down-turned edge to eliminate the need for edge finishing, the carpet structure having the same general contours as the base and periphery of the floor well and being dimensioned to snugly fit within said well in such a way that at least a portion of said raised borders abut the periphery of the well, said carpet structure including a layer of thermoformable material, and the carpet structure possessing sufficient rigidity to maintain its configuration while being removed from the well and to maintain its position within the well under foot-exerted lateral forces without shifting.

23. The floor mat of claim 22 wherein said composite carpet structure comprises a layer of carpeting laminated to a sheet of open-celled foam by an extruded thermoformable material.

* * * * *